United States Patent [19]

Atsumi

[11] Patent Number: 4,785,413
[45] Date of Patent: Nov. 15, 1988

[54] CHARACTER INPUT DEVICE IN DOCUMENT PROCESSING APPARATUS

[75] Inventor: Hiroki Atsumi, Tokyo, Japan

[73] Assignee: Casio Computer Co., Ltd., Tokyo, Japan

[21] Appl. No.: 757,074

[22] Filed: Jul. 19, 1985

[30] Foreign Application Priority Data

Jul. 30, 1984 [JP] Japan .......................... 59-116775[U]

[51] Int. Cl.$^4$ ............................................ G06F 3/023
[52] U.S. Cl. ................................................... 364/900
[58] Field of Search ... 364/200 MS File, 900 MS File

[56] References Cited

U.S. PATENT DOCUMENTS

| | | | |
|---|---|---|---|
| 4,003,029 | 1/1977 | Niiho | 364/900 |
| 4,125,868 | 11/1978 | Hruby et al. | 364/900 |
| 4,314,356 | 2/1982 | Scarbrough | 364/900 |
| 4,500,955 | 2/1985 | Chang | 364/200 |

Primary Examiner—Thomas M. Heckler
Attorney, Agent, or Firm—Frishauf, Holtz, Goodman & Woodward

[57] ABSTRACT

In a character input device in a document data processing apparatus, when a special-purpose key on a keyboard is operated in a character input device in a document, data processing apparatus and when a word, in which at least one starting character of the word designated to be a key word, coincides with at least one sought after character, and is detected as such, by a search circuit, from words key-inputted in advance, thereby establishing the coincidence, the corresponding word is stored in a text memory as a newly input word.

1 Claim, 5 Drawing Sheets

F I G. 3A
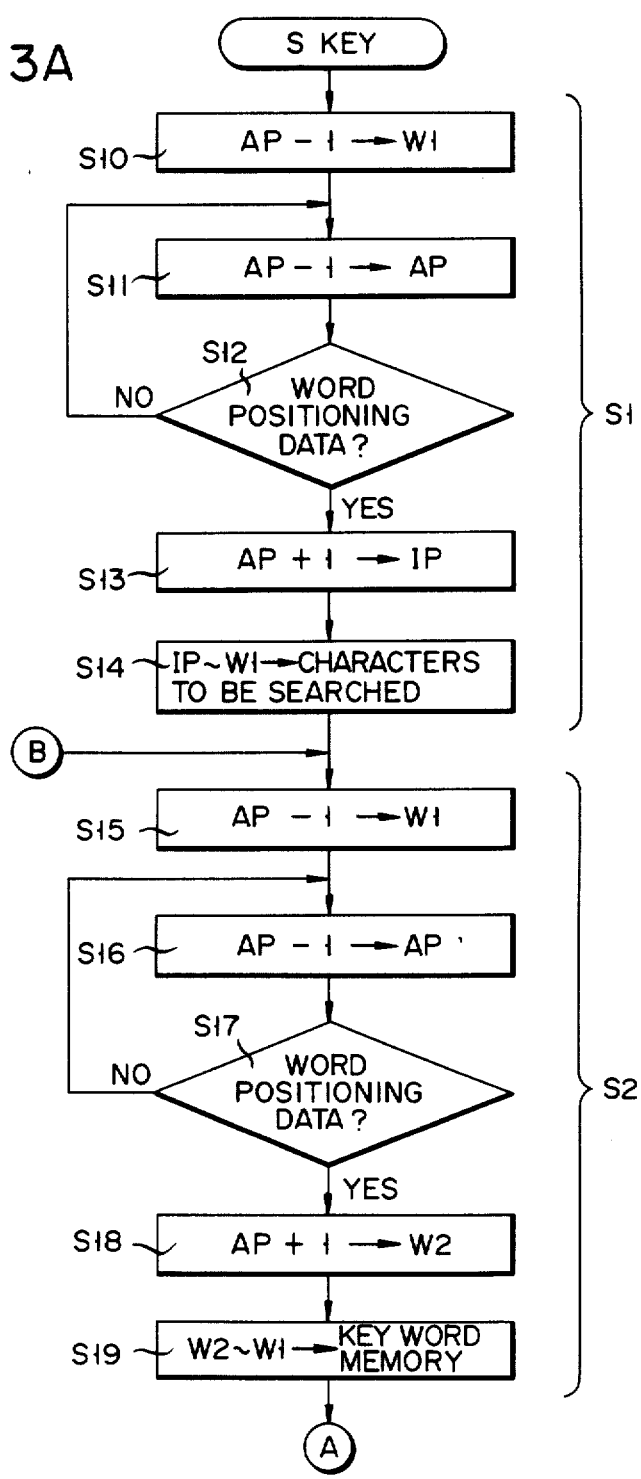

FIG. 4A

The DRAM/8203 microprocessor memory system discussed up to this point met all of our design criteria except one – optimum performance ; mic –

FIG. 4B

The DRAM/8203 microprocessor memory system discussed up to this point met all of our design criteria except one – optimum performance ; microprocessor – and

CHARACTER INPUT DEVICE IN DOCUMENT PROCESSING APPARATUS

BACKGROUND OF THE INVENTION

The present invention relates to a character input device in a document data processing apparatus.

In a conventional document data processing apparatus such as a wordprocessor, a personal computer and the like, special-purpose input keys (e.g., a dictionary registration key and a programmable function key) are provided upon whose function a word is stored. By utilizing this stored word, the operator can simplify a character input operation.

When a word is stored in a wordprocessor, many operations of a predetermined order and including an operation of special-purpose input keys are required in a conventional apparatus. Furthermore, the maximum character number of words which can be stored is limited, as is the number of special-purpose input keys, the number of the words which can be stored being dependent upon the number of special-purpose keys. Therefore, since a number of limitations exist when the words are stored in the conventional apparatus, the overall character input operation efficiency is degraded.

SUMMARY OF THE INVENTION

The present invention has been made to overcome the above drawbacks, and has as its object to provide a character input device in a document data processing apparatus wherein a key word, having search characters as starting characters thereof, can be sought out from among the search characters and stored as a new input word.

In order to achieve the above object, a character input device is provided in a document data processing apparatus. This device comprises keyboard means (11) having at least a plurality of character keys and a search key, text memory means (15) for storing document data consisting of a plurality of words and word positioning data, search character data memory means (20), connected to said keyboard means and said text memory means, both for returning a current input position of the search character data inputted in said text memory means to an input position of the word positioning data upon detection of an operation of said search key of said keyboard means, and for storing character data from a starting character in an input order, word positioning data search means (22), connected to said keyboard means and said text memory means, for searching the word positioning data previously stored in said text memory means upon detection of the operation of said search key of said keyboard means, key word memory means (19), connected to said text memory means and said word positioning data search means, for storing a word, positioned by the word positioning data as a key word, as a searching target every time the word positioning data is searched by said word positioning data search means, comparison means (24), connected to said search character data memory means and said key word memory means, for discriminating whether or not at least one character data stored in said search character data memory means coincides with at least one starting character of the key word to be searched, and a central processing unit (10), connected between said keyboard means and said text memory means, said key word memory means and said comparison means including, respectively, means (100) for controlling the writing of the input character data in said text memory means in the order of key operation, and means (100) for controlling the writing of a word, identical to the key word in said text memory means, in place of at least one character data stored in said search character data memory means, as based upon the discrimination result from said comparison means (24) for indicating coincidence.

In a character input device having the above arrangement in a document data processing apparatus according to the present invention, an identical word inputted twice or more in a single document can be inputted and stored by operating a special-purpose key with a simple character input operation. Therefore, when the apparatus of the present invention is applied to a wordprocessor or a personal computer, character input operation efficiency can be improved, resulting in easy, high-speed creation of documents.

BRIEF DESCRIPTION OF THE DRAWINGS

FIGS. 3A and 3B together are a flow chart showing an operation of the flow chart of FIG. 2 in more detail; and FIGS. 4A and 4B are views showing examples of character display in the above embodiment.

DETAILED DESCRIPTION OF THE PREFERRED EMBODIMENT

Figure 1:
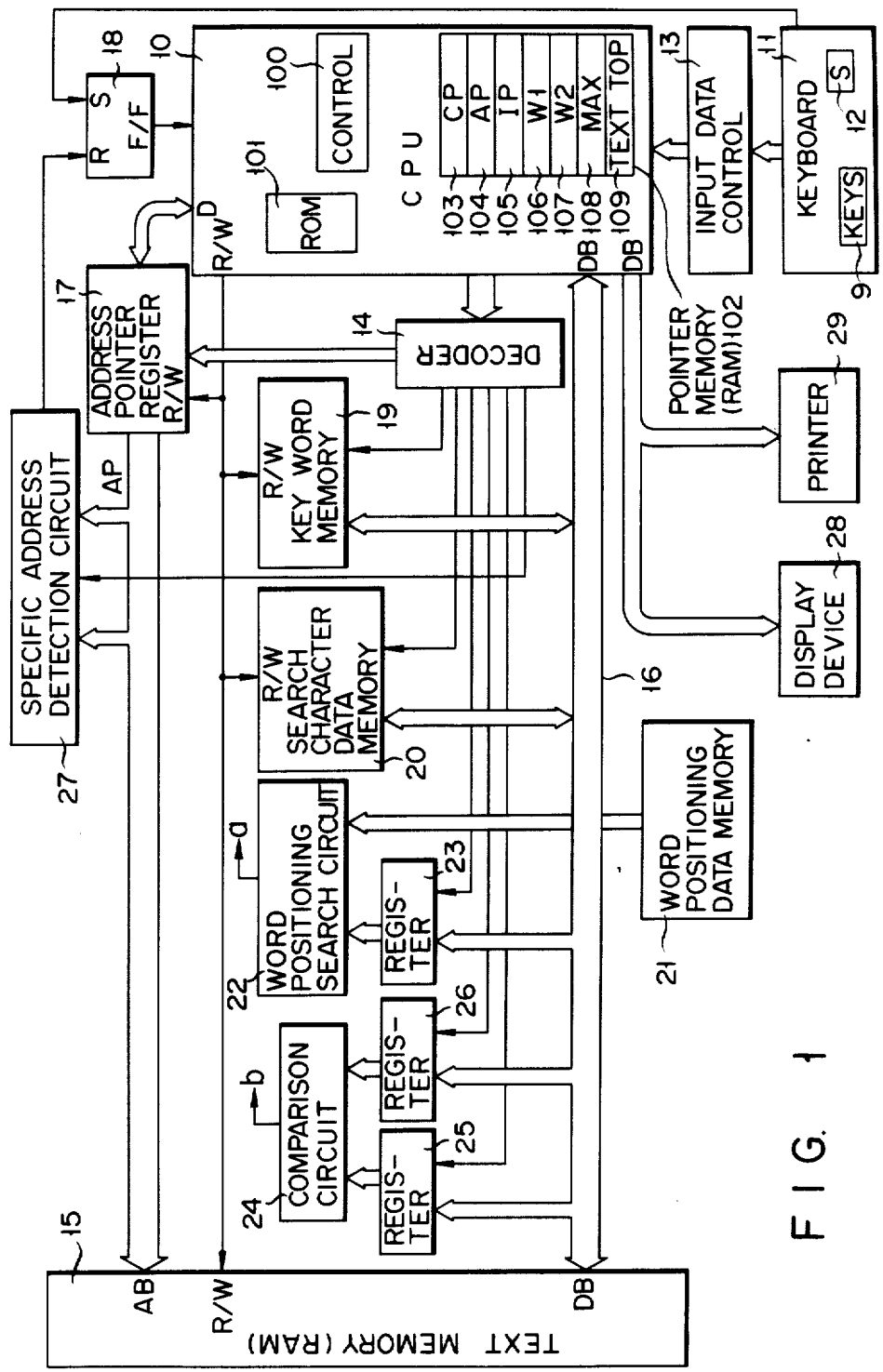
FIG. 1 is a block circuit diagram showing a circuit configuration of a character input device in a document data processing apparatus according to the present invention.

An embodiment of the present invention will be described with reference to the accompanying drawings. A microprocessor (CPU) 10 controls the overall system based on a program stored, in advance, in a ROM 101. The CPU 10 comprises a pointer memory (RAM) 102 including the following addresses: a cursor pointer address CP incicating an address position in a text memory 15 for indicating a current cursor position on a display device 28, an address designation pointer address AP for each memory area in the text memory 15, a pointer address IP of the first character of search characters in the text memory, a pointer addres W1 for indicating the last character position of a key word, a pointer address W2 for designating the first character position of the key word, a pointer address MAX for determining a previous word to start searching on a corresponding page and a starting address TEXT TOP of the text memory. A keybord 11 comprises character input keys 9 and a search key 12, and supplies a key signal corresponding to the operated key to an input data control 13. The control 13 converts the input key signal into a character code and supplies the code to the CPU 10. A decoder 14 decodes various control signals supplied from the CPU 10.

The text memory 15 is a RAM for storing character data transferred from the CPU 10 through a data bus 16. An address pointer register 17 temporarily stores an address pointer AP for designating an address in the memory 15 supplied from the CPU 10. A flip-flop 18 is set, upon operation of the search key 12 on the keyboard 11, so as to supply a set signal to the CPU 10. A key word memory 1 and a search character data memory 20 are temporary storage memories for automatic word-write processing performed under the control of the CPU 10.

A word positioning data memory 21 stores text top data (stored at a top address in the memory 15), and data encompassing punctuation data, e.g., space, comma, quotation, double quotation, period, question and exclamation data. A word positioning search circuit 22 discriminates, in accordance with data stored in the memory 21, whether or not character data read out from the memory 15 is the positioning data of a word. In this case, the character data read out from the memory 15 is temporarily stored in a register 23. A comparison circuit 24 compares storage contents of the memories 19 and 20, and generates a coincidence signal b upon detecting coincidence therebetween. In this case, the storage contents of the memories 19 and 20 are temporarily stored in registers 25 and 26, respectively. Based on the address designation pointer AP from the register 17 and the text top address (to be referred to as top pointer TP hereinafter) of the memory 15, a specific address detection circuit 27 checks if a key word for the automatic word write processing falls inside a search range on a document, detects specific data at a specific address, and resets the flip-flop 18 if the key word falls outside the search range. The display device 28 and a printer 29 are output devices for displaying and printing the character data generated from the CPU 10.

With the above arrangement, the operation of the apparatus according to the embodiment will be described with reference to FIGS. 2, 3A and 3B. Assume that the operator operates the key 9 on the keyboard 9 on the keyboard 11 so as to input characters. The input characters are displayed on the display device 28 under the control of the CPU 10. As shown in FIG. 4A, a predetermined sentence is displayed in accordance with the input characters. The input characters are stored in the memory 15. Assume that the operator depresses the search key 12 on the keyboard 11 after he inputs, e.g., "mic", as shown in FIG. 4A.

Figure 2:
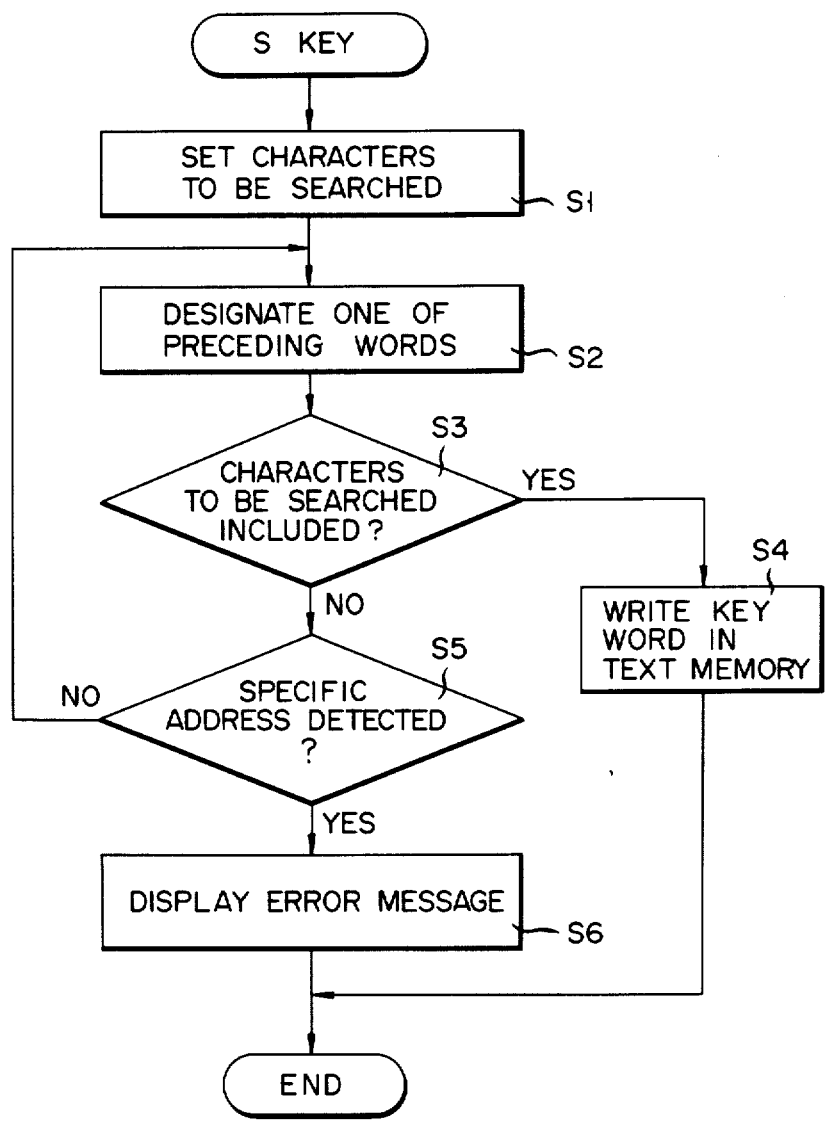
FIG. 2 is a flow chart for explaining a basic operation of the circuit shown in FIG. 1.
Figure 3B:
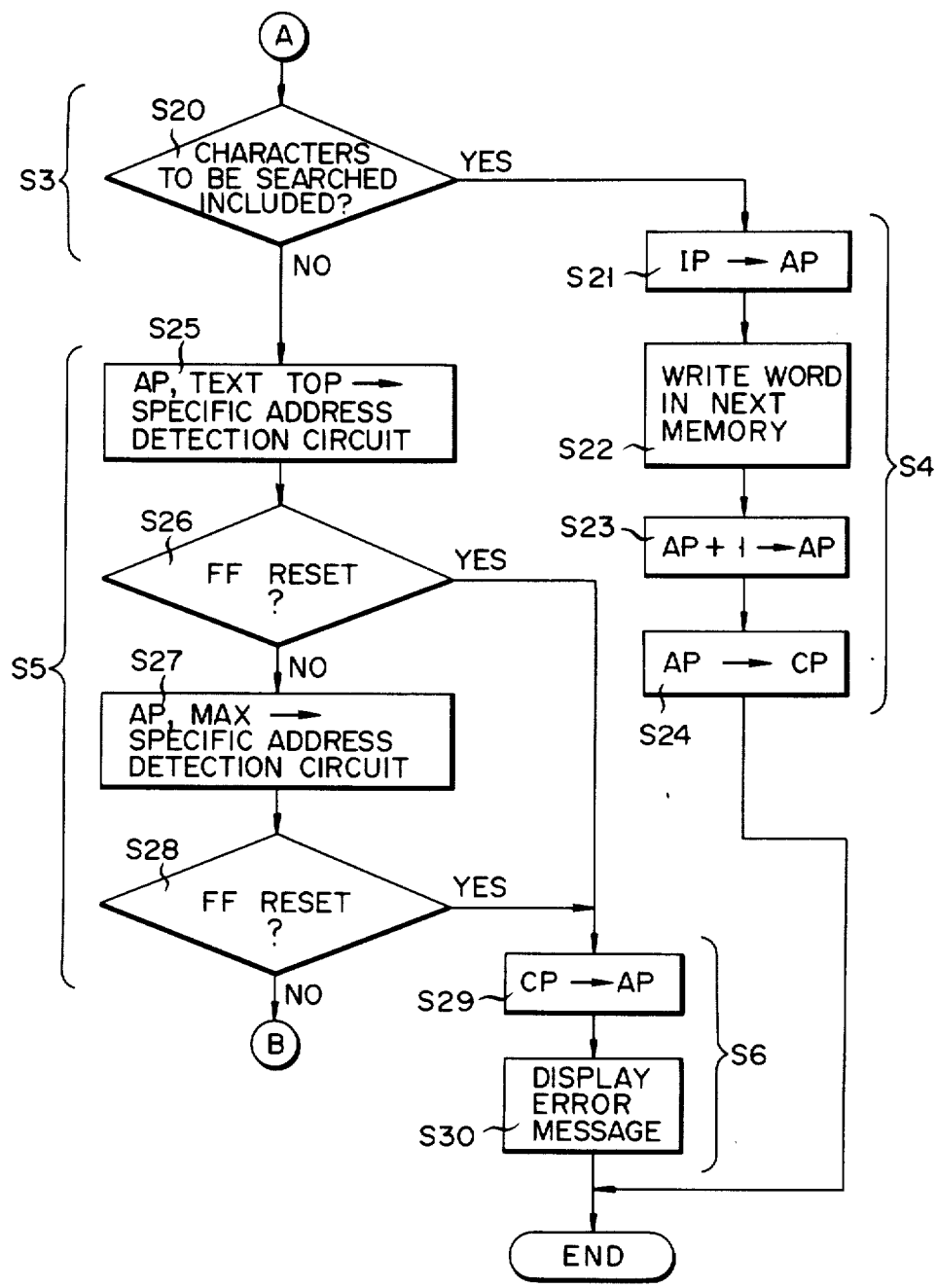

The operation shown in the flow chart in FIG. 2 is executed. In step S1, characters to be searched (in this case, starting characters of the key word such as "mic") are set. Note that the starting characters can be one character, e.g., "m". In step S2, the word immediately preceding the characters to be searched in the previously input words is designated and read out from the memory 15. Step S3 checks if the readout word includes the characters to be searched. That is, it is checked if the starting character of the readout word coincides with the characters to be searched. If YES in step S3, i.e., if coincidence is detected, the automatic word write processing is performed so that the readout word (e.g., the word "microprocessor" indicated by reference numeral 40 in FIG. 4A is stored in the memory 15 as a new input word in step S4. However, if NO in step S3, it is checked in step S5 if the designated word falls outside the search range, i.e., if the characters to be searched coincide with the starting characters of the word immediately preceding the designated word, until the text top address of the memory 15 or the address MAX is detected. In this case, if YES in step S5, an error message is displayed on the display device and the like (step S6).

The operation shown in FIG. 2 will be described in more detail with reference to the flow chart shown in FIGS. 3A and 3B and corresponding to the block diagram shown in FIG. 1. When the operator depresses the key 12, the flip-flop 18 is set, and a word search instruction is supplied to the CPU 10. The CPU 10 performs the search character setting processing of step S1, shown in FIG. 2 by processing in steps S10 to S14. The CPU 10 reads out from the memory 15 the character data at addresses sequentially designated by the address designation pointer AP, and stores the readout data in the register 23. When the circuit 22 detects the word positioning data of the character data in accordance with the storage content of the memory 21, it supplies the coincidence signal a to the CPU 10. When the CPU 10 detects the word positioning data (e.g., semicolon 41 in FIG. 4A) of the character data in response to the coincidence signal, it sets, in step S13, the initial point pointer IP as a starting address of the characters to be searched in the register 17. In step S14, the character data defined within the range from the initial pointer IP to the word pointer W1 is read out from the memory 15 in units of characters, and the readout data is stored in the memory 20. Thus, the key word "mic", shown in FIG. 4A, is stored in the memory 20.

The word stored in the memory 15 and preceding the characters to be searched is designated by the processing shown in steps S15 to S19. This corresponds to the word processing shown in step S2 of FIG. 2. The word immediately preceding the characters to be searched is selected and stored in the memory 19, in step S19. In this case, the end pointer of the word is set as the word pointer W1 in step S15, and the starting pointer is set as the word pointer W2 in step S18. The CPU 10 transfers the storage contents of the memories 19 and 20 to the registers 25 and 26. In step S20, comparison processing by the circuit 24 (corresponding to the processing step S3 of FIG. 3) is performed. The circuit 24 discriminates whether or not the characters to be searched coincide with the starting position of the word stored in the memory 19, i.e., whether the content of the memory 20 is included in that of the memory 19.

If YES in step S20, i.e., if coincidence is detected, the initial pointer IP is set in the address designation pointer AP, and the word is stored in the memory 19 (e.g., the word "microprocessor" indicated by reference numeral 40 in FIG. 4A) is written in the memory 15 in units of characters. Thus, words stored in the memory 19 are sequentially stored in the memory 15 from the initial pointer IP. When the word stored in the memory 15 is displayed on the display device 28 by the CPU 10, the same word "microprocessor" 42, as the word indicated by reference numeral 40 in FIG. 4B, is displayed at a position following the characters to be searched. In other words, when the operator inputs the characters to be searched, e.g., "mic", and operates the search key 12, the previously input word 40 is inputted as the new input word 42.

However, if NO in step S20, i.e., if the circuit 24 determines that the coincidence signal b is not generated, the search range of the storage words in the text memory 15 is checked in accordance with the address designation pointer AP and the text top TP (step S25). In this case, if the key word falls outside the search range, the flip-flop 18 is reset, and an error message is displayed on, e.g., the display device 28, as shown in step S30. Note that reference symbol CP in step S29 denotes a cursor pointer indicating a cursor position which is updated so as to continuously coincide with the address designation pointer AP. However, if it is determined that the key word falls inside the search range, the circuit 27 checks the search range in accordance with the address designation pointer AP and the pointer MAX (step S27). The pointer MAX can be arbitrarily designated by the operator so as to determine how many previous words are to be searched in accordance with a time required for searching.

If it is detected the key word falls inside the search range, the processing in steps S15 to S19 is repeated, and the word further preceding is stored in the memory 19. Note that steps S23 and S24 are required for inputting the next character.

In this manner, when the operator inputs characters to be searched, and operates the search key 12, a word having a starting portion corresponding to the characters to be searched can be searched. The searched word is stored in the memory 15 as a new input word, and is displayed on the display device 28 or the like. Therefore, unlike the conventional apparatus, a previously stored word can, in the present invention, be automatically inputted and stored in the memory 15, without limitation as to the number of its characters, merely by operating the special-purpose search key 12.

What is claimed is:

1. A character input device in a document data processing apparatus comprising:

keyboard means having at least a plurality of character keys and a search key;

text memory means for storing document data consisting of a plurality of words;

character memory means, connected to said keyboard means for storing data of at least one character constituting a word;

word search means, connected to said keyboard means and said text memory means, for searching a word previously stored in said text memory means upon detection of the operation of said search key of said keyboard means;

comparison means, connected to said character memory means and said word search means, for comparing whether or not at least one character data stored in said character memory means coincides with at least one character of a word to be searched from among the plurality of words stored in the text memory means; and a central processing unit, connected between said keyboard means and said comparison means, including means for inputting a word in a predetermined store position in said text memory means, as based upon the comparison result from said comparison means for indicating coincidence.

* * * * *